(12) United States Patent
Bellers

(10) Patent No.: US 8,964,116 B2
(45) Date of Patent: Feb. 24, 2015

(54) SPATIAL AND TEMPORAL DE-INTERLACING WITH ERROR CRITERION

(75) Inventor: Erwin Bellers, Fremont, CA (US)

(73) Assignee: Entropic Communications, Inc., San Diego, CA (US)

( * ) Notice: Subject to any disclaimer, the term of this patent is extended or adjusted under 35 U.S.C. 154(b) by 1862 days.

(21) Appl. No.: 11/915,288

(22) PCT Filed: May 23, 2006

(86) PCT No.: PCT/IB2006/051654
§ 371 (c)(1),
(2), (4) Date: Aug. 14, 2008

(87) PCT Pub. No.: WO2006/126169
PCT Pub. Date: Nov. 30, 2006

(65) Prior Publication Data
US 2010/0157147 A1    Jun. 24, 2010

Related U.S. Application Data

(60) Provisional application No. 60/684,247, filed on May 23, 2005, provisional application No. 60/753,851, filed on Dec. 23, 2005.

(51) Int. Cl.
*H04N 7/01* (2006.01)
*H04N 11/20* (2006.01)
*H04N 7/00* (2011.01)

(52) U.S. Cl.
CPC .............. *H04N 7/012* (2013.01); *H04N 7/0142* (2013.01)
USPC ............................ 348/448; 348/441; 348/538

(58) Field of Classification Search
USPC ......................................... 348/441, 448, 538
See application file for complete search history.

(56) References Cited

U.S. PATENT DOCUMENTS

| 5,936,676 | A | 8/1999 | Ledinh et al. | |
|---|---|---|---|---|
| 2004/0070686 | A1* | 4/2004 | Jung et al. ..................... | 348/448 |
| 2004/0257467 | A1* | 12/2004 | Nicolas .......................... | 348/452 |
| 2005/0073607 | A1* | 4/2005 | Ji et al. .......................... | 348/448 |
| 2005/0212974 | A1* | 9/2005 | Michel et al. ................. | 348/699 |

(Continued)

FOREIGN PATENT DOCUMENTS

| JP | 2004-48465 | 7/2002 |
|---|---|---|
| JP | 2003530786 | 10/2003 |

OTHER PUBLICATIONS

Bellers, E.B. et al.: "De-interlacing—A key technology for Scan Rate Conversion"; Advances in Image Communications, Elsevier Science BV, vol. 9, 2000, ISBN 0-444-50594-6 (185 pages).
De Haan, G. et al.: "De-interlacing—An overview" (Abstract); The proceedings of the IEEE, vol. 86, No. 9, pp. 1839-1857, Sep. 1998.

(Continued)

*Primary Examiner* — Nasser Goodarzi
*Assistant Examiner* — Kyu Chae
(74) *Attorney, Agent, or Firm* — Richard Bachand

(57) ABSTRACT

A de-interlacing device and method are provided that may be used in a memory based video processor. The de-interlacer mixes the output of a temporal de-interlacer and a spatial de-interlacer. Two separate error values are used; one for the temporal de-interlacer and another for the spatial de-interlacer. The de-interlacing device calculates from the two error values, using a non-linear mapping, a mix factor used to mix between the outputs of the spatial and temporal de-interlacers.

19 Claims, 5 Drawing Sheets

(56) References Cited

U.S. PATENT DOCUMENTS

2005/0219390 A1* 10/2005 Tajima et al. .................. 348/246
2006/0158550 A1* 7/2006 Zhou et al. .................... 348/452

OTHER PUBLICATIONS

De Haan, G. et al.: "De-interlacing of Video Data Using Motion Vectors and Edge Information" (Abstract).

* cited by examiner

SPATIAL AND TEMPORAL DE-INTERLACING WITH ERROR CRITERION

BACKGROUND OF THE INVENTION

Many de-interlacing methods have been published in literature and/or are being commercially used in various products. Methods range from simple spatial de-interlacers to motion-compensated de-interlacers.

The category of spatial de-interlacers, however, is important, as it is often used as a kind of fall-back in case the motion vectors used in the interlacing processes are unreliable, but moreover, it is the category of de-interlacers relied on in low-cost systems. Overviews of de-interlacers (including spatial ones) can be found in G. de Haan and E. B. Bellers, 'De-interlacing—An overview', *The proceedings of the IEEE*, vol. 86, no. 9, pp. 1839-1857, September 1998 and E. B. Bellers and G. de Haan, 'De-interlacing—A key technology for Scan Rate Conversion', *Advances in Image Communications*, Vol. 9, ISBN 0-444-50594-6, Elsevier Science B. V., 2000. Another spatial de-interlacer that is not included in the References above can be found in G. de Haan and R. Lodder, 'De-interlacing of video data using motion vectors and edge information', *Digest of the ICCE '02*, pp. 70-71, June 2002.

In the above references, edge information is utilized to improve the de-interlacing quality. This type of de-interlacer is referred to as an EDDI (Edge Dependent De-Interlacing) type of de-interlacer. Although EDDI exceeds the quality level of many other spatial de-interlacers, its quality level is insufficient for the video and digital video demands of the near future. Moreover, the complexity and memory requirements are relatively high for spatial de-interlacers. Furthermore, some general ideas for a new type of directional de-interlacer are presented in the preceding papers, but at present there is no means to calculate the reliability of a directional interpolation.

In addition and as discussed in the above papers, there has been an attempt to provide a "sort of mix between a spatial and a temporal de-interlacer. An example of such a mix is, the Adaptive Recursive de-interlacer (see, G. de Haan and E. B. Bellers, 'De-interlacing—An overview', *The proceedings of the IEEE*, vol. 86, no. 9, pp. 1839-1857, September 1998 and E. B. Bellers and G. de Haan, 'De-interlacing—A key technology for Scan Rate Conversion', *Advances in Image Communications*, Vol. 9, ISBN 0-444-50594-6, Elsevier Science B. V., 2000) which calculates how well vertical neighboring samples can be created from the previous de-interlaced picture. This match provides a metric for reliability of the temporal interpolation, and as such, is used to mix between the temporal and spatial interpolation. Another example that is found in the two above articles was proposed by Bock. Bock proposed to mix between a spatial and temporal de-interlacer based on the output of a motion detector, i.e. if motion is detected, there is a bias towards the spatial de-interlacer and otherwise bias towards the temporal de-interlacer.

These algorithms have a linear relationship between an error/reliability metric (e.g. how well can the current field be regenerated out of the previous de-interlaced picture, or how likely is the current pixel a part of a moving object, etc) and the mix factor used to mix the spatial and temporal de-interlacer. Moreover, the algorithms rely heavily on a single error criterion.

BRIEF SUMMARY OF THE INVENTION

Embodiments of the present invention provide a de-interlacer and method of de-interlacing that may be used for a directional de-interlacer, but may also be used for other applications seeking a reliability metric for directional information. In addition, embodiments of the invention compute the calculation of the reliability of a directional interpolator can be used to enable a mixing of, or selection between a directional and a vertical interpolation.

Furthermore, embodiments of the invention uses two separate error values, i.e. one for its spatial de-interlacer, and one for its temporal de-interlacer, and calculates from these values, using a non-linear mapping, a mix factor used in the mix of or selection between the spatial and temporal de-interlacer.

De-interlacing is used in many applications where there is a need to convert interlaced video to progressive video. Such applications include television sets, DVD recorders or players, scan rate converters, LCD projectors, PC television cards, studio equipment, and any other similar equipment or derivations thereof Furthermore, a method of calculating a reliability of a directional interpolation is provided wherein, one embodiment includes using the reliability of both the directional and vertical interpolation to determine a mix factor between the directional and vertical interpolation results. Furthermore, both the information along and perpendicular to a detected dominant edge may be used. An exemplary method further may also include calculating a mix factor based on two error functions. Some embodiments include error values that are non-linearly mapped to mix factor candidates, both the final mix factor is calculated based on the contribution of the two mix values to the video signal, and the final mix factor depends on the expected contribution of the spatial and temporal de-interlacer to the high vertical frequencies in the video signal.

It is understood that the above summary of the invention is not intended to represent each embodiment or every aspect of the present invention.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE INVENTION

Figure 1:
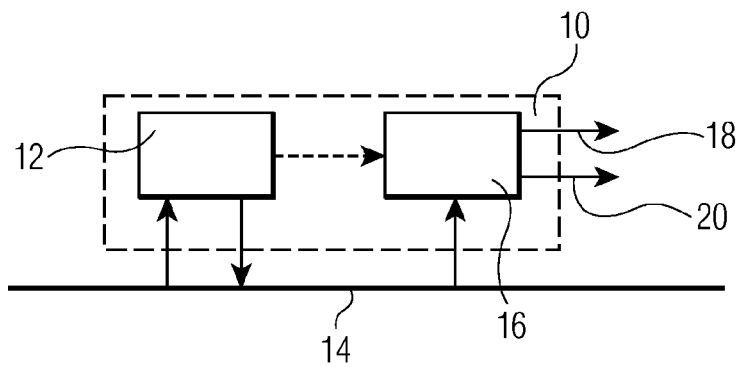
FIG. 1 is a block diagram of a an exemplary video pipe.

A Memory-Based Video Processor (MBVP) is considered a successor of the Memory Based Scaler (MBS). As the name suggests, the MBVP can interface via memory, although direct streaming is a possibility also. An exemplary Video pipe 10 that incorporates an exemplary MBVP device 12 is shown in FIG. 1. The MBVP device 12 interfaces a memory bus 14 and provides an input to a CPIPE (composition pipe) 16. A CPIPE 16 processes the inputs and processes the outputs(s) 18, 20.

Figure 2:
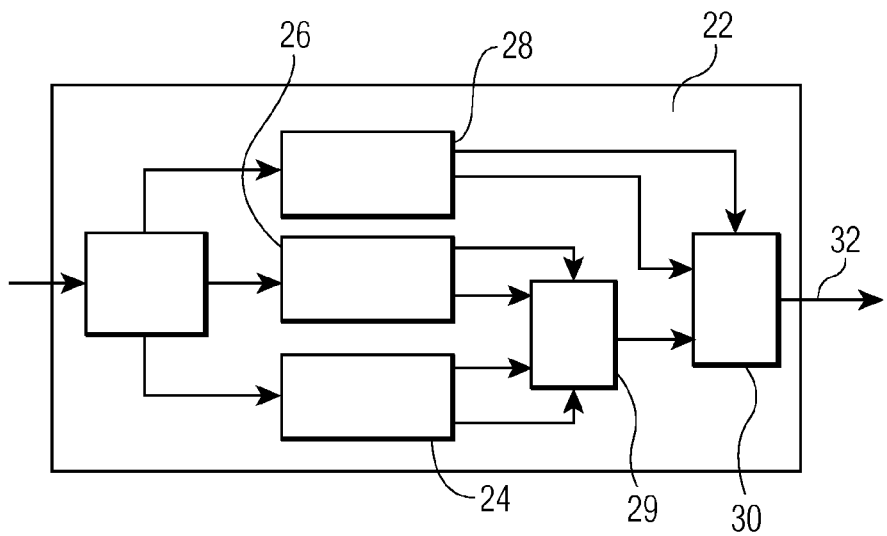
FIG. 2 is a block diagram of an exemplary de-interlacer architecture.

An exemplary MBVP device 12 comprises various components of which a de-interlacer is one. An exemplary de-interlacer block diagram 22 is shown in FIG. 2. The MBVP de-interlacer 22 comprises a spatial de-interlacer, a temporal de-interlacer 26, a film/still detector 28 and some mixers 29, 30.

The first mixer 29 basically mixes the output of the temporal de-interlacer 26 and the spatial de-interlacer (EDDI+) 24 on a pixel basis. In order to do so, error criterions are used. These error criterions form a measure for the reliability of the spatial 24 and temporal de-interlacer 26. Furthermore, the film-still detector 28 can change the output 32, using the second mixer 30, and will do so if either a film or a still has been detected.

An exemplary de-interlacer 22 may have various main features and characteristics. As such an exemplary de-interlacer 22 can interpret measurements in order to enable the detection of video, 2:2 and 3:2 pull down film, irregular film, a still, and, film phase (if the source is 'film'). Local film/still detection is incorporated to adapt the processing to local stationary picture parts and to cope with hybrids (film overlaid with video). An exemplary de-interlacer may also include 3 or 4 fields still detection and 3 fields global measurements.

A temporal de-interlacer 26, for example, provides the majority-selection de-interlacing and may require 2 or 3 fields, but is not limited to do as such in various embodiments of the invention. A spatial de-interlacer 24 provides advanced Edge Dependent De-Interlacer (EDDI+). Furthermore, mixers 29, 30 provide advanced mixing between spatial and temporal de-interlacing outputs, as well as a means to change de-interlacer output dependent on the film/still detector results.

Conversely, in an exemplary MBVP architecture, the spatial and temporal de-interlacer run concurrently. Reliability metrics are used to produce a proper mixing of the special and temporal de-interlacers.

First with respect to the spatial de-interlacer 24, by definition, a spatial de-interlacer uses information from the current field only. The field data contains aliasing if higher vertical frequencies are present in the scene because no proper pre-filtering is applied prior to sampling in, for example, a camera.

By applying a vertical interpolating filter, the spatial high frequency components can not be regenerated. New frequency components can only be created by non-linear processing. One such a processing is realized by directional interpolation, i.e. interpolation along the edges in the picture.

The directional de-interlacer 24 of the MBVP 22 may be called an EDDI+. The algorithm for the exemplary EDDI+ comprises various stages. First a dominant edge (if any) is detected. Second, an interpolation along the edge is performed. Next, an amount of protection, based on the reliability of the directional information, is applied.

To better understand various stages of EDDI+, the sub-stages are discussed below in more detail.

Dominant Edge Detection:

Edge detection and the determination of the dominant edge direction is far from a trivial process. The edges of items in a picture are often not well defined, i.e. the picture may contain a lot of noise, the edge slope might be rather flat (i.e., close to a horizontal line), the edge center may not necessarily co-inside with the pixel grid, edges can be very thin, only a very small spatial neighborhood is known, etc. In any case, an edge is defined as a substantial transition in the luminance space from the one luminance level to the other between close neighboring samples in any spatial direction. Note, that this is true for an edge sample, but the reverse is not necessarily true (e.g. due to noise).

Figure 3:
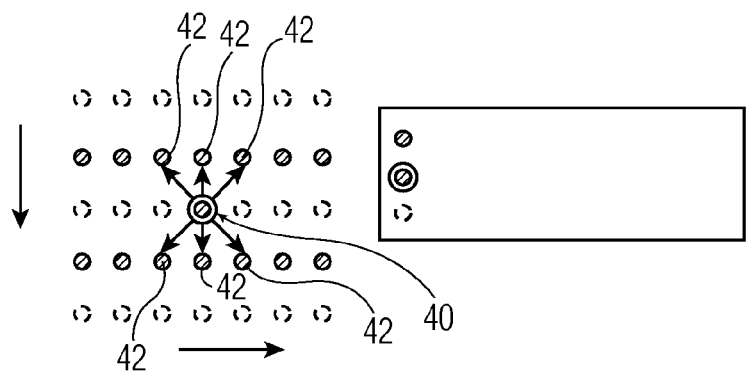
FIG. 3 depicts edge direction detection.

A decision on edge characteristics for the current-to-be-interpolated sample 40 must be made based on the pixel data available in its direct neighborhood. A straightforward approach is illustrated in FIG. 3. As illustrated, centered around the current pixel 40, pixels 42 are being compared with each other:

$$x_i(\vec{x},n) = \left| F\left(\vec{x} - \begin{pmatrix} i \\ 1 \end{pmatrix}, n\right) - F\left(\vec{x} + \begin{pmatrix} i \\ 1 \end{pmatrix}, n\right) \right| \quad (1)$$

with $F(\vec{x},n)$ the sample at position $\vec{x}=(x,y)^T$ with the T for transpose, n the field number, i is the horizontal displacement defining the slope of the edge, and $\xi_i(\vec{x},n)$ is the absolute difference or error for the direction given by i.

Multiple directions can be evaluated. Such multiple directions are not limited to three directions indicated in FIG. 3. An embodiment could even consider evaluating intermediate pixel positions with p being a rational number. In this particular case, interpolation in the horizontal direction can be conducted prior to calculating the error metric. The 'dominant' edge, with direction p, could be defined by the one yielding the smallest error:

$$p = \{i | (\xi_i = \text{MIN}(\xi_{-j}, \ldots, \xi_j))\} \quad (2)$$

The above exemplary approach is unfortunately very 'error-prone'. The decision of the edge is based on just a few (actually 2) pixels and the error criterion is based on the smallest difference between these pixels. As such, the decision is very susceptible to noise. Moreover, in many cases, there is no dominant minimal, and as such, the result of the approach may indicate that multiple directions could be correct (or none of the directions are correct), etc.

Figure 4:
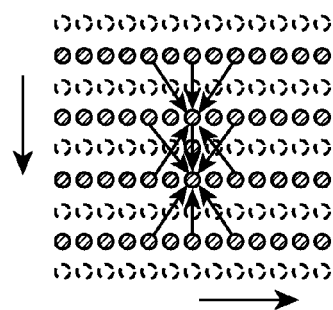
FIG. 4 depicts edge detection on a macro level.

The exemplary Edge Dependent De-Interlacer (EDDI+) first tries to improve on the detection of a 'consistent' edge. In order to do so, the edge direction is being determined on a somewhat larger scale, which in this document is referred too as being determined on a macro-level. Once the edge direction is determined, the information is applied to the micro (nearest pixels) level. FIG. 4 illustrates edge direction detection on the macro level.

As illustrated in FIG. 4, the samples from a somewhat large neighborhood of pixels are used to 'regenerate' the direct vertical neighboring samples:

$$\xi_i = \left| \frac{F\left(\bar{x} - \binom{2i}{3}, n\right) + F\left(\bar{x} + \binom{2i}{1}, n\right)}{2} - F\left(\bar{x} - \binom{0}{1}, n\right) \right| + \quad (3)$$

$$\left| \frac{F\left(\bar{x} - \binom{2i}{1}, n\right) + F\left(\bar{x} + \binom{2i}{3}, n\right)}{2} - F\left(\bar{x} - \binom{0}{1}, n\right) \right|$$

To prevent sub pixel interpolation on the micro-level, the distances could be multiplied by 2 on the macro-level as shown in Equation 3. It is understood that other techniques are also valid.

Figure 5:
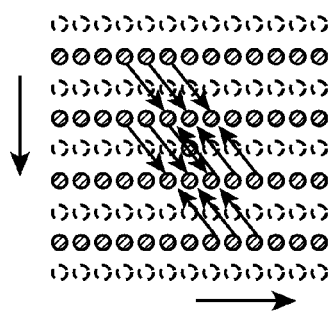
FIG. 5 depicts edge orientation detection with increased horizontal support in accordance with an embodiment of the invention.

The error criterion is now not based on just two samples, but instead it is based on 6 samples, which improves robustness. However, in experiments it was found that even a better robustness was desired. As such and as shown in FIG. 5, the horizontal consistency was further increased by taking horizontally neighboring samples in to account.

(4)

$$\xi_i = \sum_{-j}^{j} \left( \begin{array}{c} \left| \frac{F\left(\bar{x} - \binom{2i-j}{3}, n\right) + F\left(\bar{x} + \binom{2i-j}{1}, n\right)}{2} - F\left(\bar{x} - \binom{-j}{1}, n\right) \right| + \\ \left| \frac{F\left(\bar{x} - \binom{2i+j}{1}, n\right) + F\left(\bar{x} + \binom{2i+j}{3}, n\right)}{2} - F\left(\bar{x} + \binom{j}{1}, n\right) \right| \end{array} \right)$$

The amount of horizontal support defined by j, can even be further increased, however, in this exemplary EDDI+ it has been set to 1 as illustrated.

Figure 6:
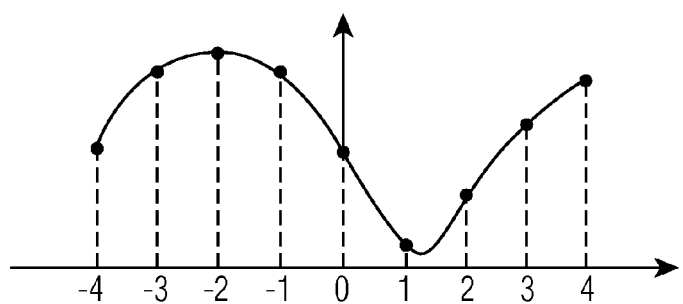
FIG. 6 is a graph that shows an exemplary error map of $\xi_i$ with 0 being the position of the current sample.

It is assumed that the direction yielding the minimum error has a strong correlation with the direction of the edge, i.e. the dominant edge direction. In Equation 2, the dominant direction was determined by the overall minimum. However, the error map might reveal multiple minima and, as such it, becomes less trivial as to which one to select. FIG. 6 shows an exemplary error map. Therefore, a search for the minima starts with observing the characteristic of the slope in the error map around the current pixel. If a clear slope is identified, the search is biased towards the downhill side of the slope. If no obvious slope was found, a global search will be started.

In FIG. 6, a clear slope is detected if:

$$((|\xi_{-1} - \xi_0| + |\xi_0 - \xi_1|) \cdot \alpha) \geq \xi_0 \quad (5)$$

with α being a programmable gain factor.

In the example of FIG. 6, Equation 5 is likely satisfied, and as such, the search is directed towards the right side. The position of the minimum defines the dominant edge direction.

Note, although we have identified the dominant edge direction, it is not guaranteed that the assumptions made to determine the dominant direction are valid in all situations. This is elaborated on below.

Directional Interpolation

Figure 7:
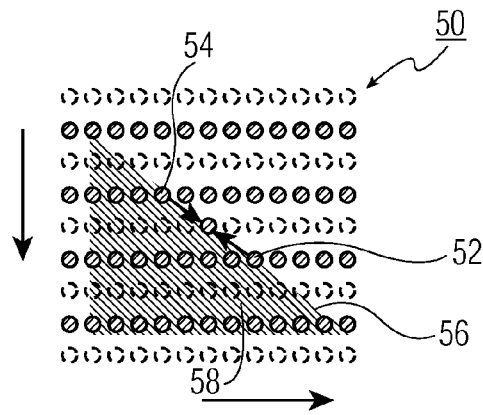
FIG. 7 depicts a field of pixels, an object with an edge and directional interpolation in accordance with an embodiment of the invention.

Referring now to FIG. 7, pixels of a part of a field are shown. The large samples 52, 54 have been identified as vertical neighboring samples that form an edge 56 of an object 58. As such, the interpolation is defined by;

$$F_{dir}(\bar{x}, n) = \frac{F\left(\bar{x} - \binom{p}{1}, n\right) + F\left(\bar{x} + \binom{p}{1}, n\right)}{2} \quad (6)$$

with $F(\vec{x}, n)$ the sample at position $\vec{x} = (x, y)^T$ with the T for transpose, n the field number, and p the horizontal displacement defining the slope of the edge. Obviously longer FIR filters can be used for the interpolation process.

The parameter p has integer accuracy. This also means that only a limited number of directions can be used for the directional interpolation. A typical amount is 9 directions, which equates to the following interpolation angles (assuming equal distances between vertical and horizontal neighboring pixels). In an embodiment of the invention pure horizontal is zero degrees):

TABLE 1

Pixel Interpolation distance versus angles in degrees

| | Pixel Distance | | | | | | | | |
|---|---|---|---|---|---|---|---|---|---|
| | −4 | −3 | −2 | −1 | 0 | 1 | 2 | 3 | 4 |
| Angle [degrees] | 166/ −14 | 162/ −18 | 153/ −27 | 135/ −45 | 90/ −90 | 45/ −135 | 27/ −153 | 18/ −162 | 14/ −166 |

The major challenge is not the interpolation, but the determination of the edge direction, or more precisely, the variable p, and the calculation of the reliability of the detected edge direction. An incorrect value for p can result in annoying artifacts, and as such, protection schemes are needed to avoid these annoying artifacts.

Protection

Although the search for the dominant edge direction is based on reasonable assumptions, it is not guaranteed that the classified or found dominant edge direction is also a TRUE dominant edge direction. Sometimes, the local information is ambiguous, and it becomes difficult to decide on the edge direction. In order to cope with these inaccuracies in the decisions, the spatial de-interlacer will not only produce the directional interpolated sample, but also a mix between the directional and the vertical interpolated sample:

$$F_{spat}(\vec{x}, n) = \alpha F_{av}(\vec{x}, n) + (1-\alpha)F_{dir}(\vec{x}, n) \quad (7)$$

with $$F_{av}(\vec{x}, n) = \frac{F\left(\vec{x} - \binom{0}{1}, n\right) + F\left(\vec{x} + \binom{0}{1}, n\right)}{2} \quad (8)$$

The vertical interpolated sample is a rather safe fall-back. It will not introduce severe artifacts. But, the vertical interpolated sample will, however, lower the vertical resolution, and may introduce line flicker.

The calculation of this mix fact a is based on the reliability or the amount of thrust there is in the classified dominant edge direction. There are various metrics that contribute to this reliability:

1) A first metric is based on the reliability of the correct search in the error space.
2) The second metric is based on edge characteristics that are reflected in the samples of the edge.

Figure 8:
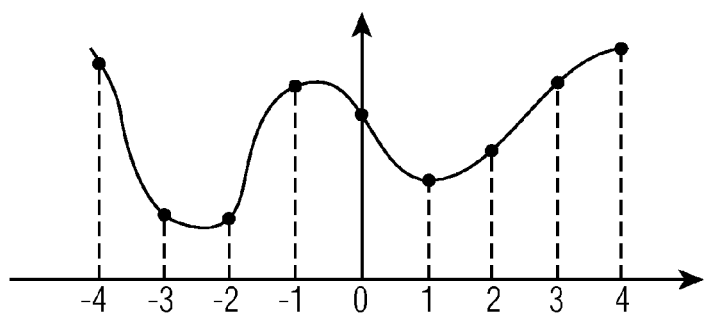
FIG. 8 shows a graph of an error map with multiple minimas.

To increase confidence in the classified dominant edge direction, an additional sanity check is conducted for specific 'problem' cases. One of these problem cases is the situation of having multiple minimas in the error map. FIG. 8 shows a graph of an error map with multiple minimas.

A new search is started left and right from the initial selected position of the minimum. On both sides, the next minimum (at least two positions apart) and the maximum are detected and its values stored for further analysis. So in the example of FIG. 8, suppose an initial minimum was found at position −1. The search for a minimum on the left side is conducted over the errors at position −4 to −1. The search for the maximum on the left side is conducted with the samples from positions −4 to 0. Similarly on the right side for the minimum only the samples from positions 3 and 4 are used, and for the maximum the samples at positions 2 to 4 are used.

If a strong edge on either side of the position of the initial minimum is found, it is rather likely that multiple edges exist in the neighborhood. As a result, the reliability of the initial identified dominant edge position decreases. This reliability is reflected in a gain factor κ.

In experiments, good results were obtained by setting the gain factor to 0 if the difference between the minimum and maximum is at least a factor of 4. The gain is set to 2, if the difference is at least a factor 3. It is set to 3 if the difference is at least a factor 2 and finally the gain is set to 4 in all other cases. (Note that κ=1 is not being used).

This gain factor κ is used in the comparison between the 'directional error' and the 'vertical error' (see Equation (17). These 'errors' are defined below.

Figure 9:
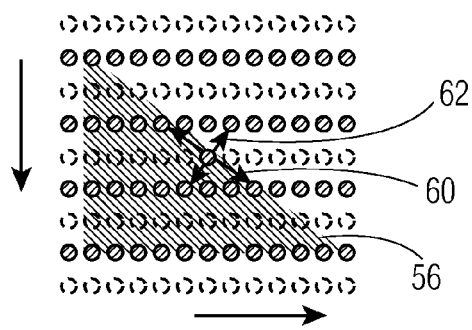
FIG. 9 depicts a field of pixels having a small gradient along the edge of an object and large gradient across the edge object.

The error criterion used for the search for the dominant edge direction is based on the 'macro-level' samples, as intended. However, an error metric on the micro-level is used in the interpolation process indicating the reliability of the directional information. This error metric can be calculated by:

$$\xi_p(\vec{x}, n) = \left| F\left(\vec{x} - \binom{p}{1}, n\right) - F\left(\vec{x} + \binom{p}{1}, n\right) \right| \quad (9)$$

this is identical to the error criterion used in Equation (1). However, now it is NOT being used to determine the edge direction, but instead it is being used as an error criterion in the interpolation process after the edge direction has been determined Referring now to FIG. 9, various experiments have revealed that this error criterion could be further improved. A closer look at the definition of an edge guided us to improve this error criterion. A major characteristic of the edge 56 is that along the edge 60 the luminance levels remain fairly constant, i.e. a lower error according to Equation (9), while at the same time transitions that are perpendicular to the edge 62 show the maximum gradient, i.e. a very large error. If both conditions are satisfied, it is very likely that the edge 56 has been classified correctly.

The samples on the perpendicular can be calculated from the detected edge direction. However, the 'perpendicular samples' do likely not co-inside with the pixel grid, and as such, interpolation would be needed. In EDDI+, the perpendicular samples are determined by rounding to the nearest pixel. If p defines the edge direction, then q defines the perpendicular direction, and the associated error equals.

$$\xi_q(\vec{x}, n) = \left| F\left(\vec{x} - \binom{q}{1}, n\right) - F\left(\vec{x} + \binom{q}{1}, n\right) \right| \quad (10)$$

with the characteristics that:

$$\xi_q(\vec{x}, n) >> \xi_p(\vec{x}, n) \quad (11)$$

As both conditions need to be satisfied, the error function or reliability of the directional information is defined by:

$$\xi_{dir} = \beta(\xi_p(\vec{x}, n) + (M - \xi_h d\, q(\vec{x}, n))) \quad (12)$$

with M being the largest possible or maximum number of $\xi_i$ (which equals $2^N - 1$, with N being the number of bits to represent a video sample, and with β being a gain factor. In EDDI+, β is generally set to ¼, and M is generally set to be equal to 1023 for a 10 bit input video. Other values for β and M may also be used.

One might question why this was not initially used as THE error criterion for the determination of the edge direction instead of for the error metric indicating the 'reliability' of the directional information. Experimentation revealed that this was less reliable for the determination for the edge direction due to the fact that an error is made in q as a result of rounding, and moreover, the decision can be too strongly biased towards the component across the edge. Note that the directional interpolation takes place along the edge. As such, it is important to have a small difference in this direction.

At this point a directional error has been determined, but it does not provide sufficient data on how to determine a mix factor used to fade between the directional and vertical interpolation.

To provide a solution for the calculation of the mix factor, it should be understood that the directional error is related to the vertical error. Remember that the interpolation in the vertical direction is rather safe. So, if the error in the vertical direction is about the same amplitude as the directional error, it might be safer to bias toward the vertical interpolation. If the directional error is much smaller than the vertical error, a bias towards the directional is recommended.

The vertical error is calculated in a similar manner as the directional error. The 'along-the-edge' component equals:

$$\xi_v(\vec{x}, n) = \left| F\left(\vec{x} - \binom{0}{1}, n\right) - F\left(\vec{x} + \binom{0}{1}, n\right) \right| \quad (13)$$

The perpendicular component is less trivial to compute, because the pure horizontal information is lacking. However, a good estimate is achieved by calculating:

$$\xi_h(\vec{x}, n) = \text{MAX}\begin{pmatrix} |F_{avm1}(\vec{x}, n) - F_{avp1}(\vec{x}, n)|, \\ |F_{avm2}(\vec{x}, n) - F_{avp2}(\vec{x}, n)| \end{pmatrix} \quad (14)$$

with $$F_{avm1}(\vec{x}, n) = \frac{F\left(\vec{x} + \begin{pmatrix} -1 \\ 1 \end{pmatrix}, n\right) + F\left(\vec{x} + \begin{pmatrix} -1 \\ -1 \end{pmatrix}, n\right)}{2} \quad (15)$$

$$F_{avp1}(\vec{x}, n) = \frac{F\left(\vec{x} + \begin{pmatrix} 1 \\ 1 \end{pmatrix}, n\right) + F\left(\vec{x} + \begin{pmatrix} 1 \\ -1 \end{pmatrix}, n\right)}{2}$$

$$F_{avm2}(\vec{x}, n) = \frac{F\left(\vec{x} + \begin{pmatrix} -2 \\ 1 \end{pmatrix}, n\right) + F\left(\vec{x} + \begin{pmatrix} -2 \\ -1 \end{pmatrix}, n\right)}{2}$$

$$F_{avp2}(\vec{x}, n) = \frac{F\left(\vec{x} + \begin{pmatrix} 2 \\ 1 \end{pmatrix}, n\right) + F\left(\vec{x} + \begin{pmatrix} 2 \\ -1 \end{pmatrix}, n\right)}{2}$$

So, the vertical error is then defined by:)))

$$\xi_{vert} = \beta(\xi_v(\vec{v}, n) + (M - \xi_h(\vec{x}, n))) \quad (16)$$

Finally, we have all the ingredients to calculate the mix factor. The exemplary mix factor is determined by the relative difference between the two errors, with an additional gain control on the vertical one:

$$2\xi_{dir} \leftrightarrow \kappa\xi_{vert} \quad (17)$$

If $16\xi_{dir} > 8\kappa\xi_{vert}$ then a (see Equation (7) is set to 1. If $16\xi_{dir} > 7\kappa\xi_{vert}$ then α is set to 7/8. If $16\xi_{dir} > 6\kappa\xi_{vert}$ then α is set to 6/8, and so on till α reaches 0.

Next to the spatially de-interlaced sample, the reliability of the directional interpolation is passed along to the spatial-temporal mixer 29. The spatial reliability used is defined as:

$$\xi_{spat}(\vec{x}, n) = \xi_p(\vec{x}, n) = \left| F\left(\vec{x} - \begin{pmatrix} p \\ 1 \end{pmatrix}, n\right) - F\left(\vec{x} + \begin{pmatrix} p \\ 1 \end{pmatrix}, n\right) \right| \quad (21)$$

The temporal de-interlacer 26 performs temporal de-interlacing. By definition a temporal de-interlacer uses temporal information, i.e. information from multiple pictures. In an exemplary MBVP 2 or 3 successive fields are used in the temporal de-interlacer. An exemplary temporal de-interlacer is of the category 'Majority Selection (MS). A MS de-interlacer is generally based on the median of the output of several de-interlacers. The choice of de-interlacers that form the input of the median must adhere to certain rules; 1) There should always be a majority of de-interlacers with a common desired strength, and 2) There is no majority with an undesired common weakness.

In an exemplary MBVP device various de-interlacers are being calculated and a selection can be made by the user to determine the MS de-interlacing setting. In one embodiment of the invention eight de-interlacers are calculated. Such de-interlacers include, but are not limited to vertical temporal filters and modified temporal filters.

The temporal de-interlacer 26, like the special de-interlacer 24 calculates an error metric that is used in the spatio-temporal mixer 29. In an exemplary temporal de-interlacer four or more error criterions are being calculated of which four are selected in correspondence with the MS de-interlacer, although a user can select any combination of the calculated error metrics to be provided to the mixer 29.

Mixing

The spatio-temporal mixer 29 receives error metrics from the temporal de-interlacer 26 and the spatial de-interlacer 24. Mixing the results of the spatial and temporal de-interlacers is now described.

In order to prevent too much noise sensitivity at low errors, a bias toward either the spatial or temporal de-interlacer is needed. A fixed bias is generally not desired. Thus, another criterion is defined that provides a means to mix between the de-interlacers with a bias towards the spatial or the temporal de-interlacer.

Furthermore, a problem with large errors can be solved by biasing the mix towards the spatial de-interlacer, as it is known that, in general, spatial de-interlacers yield less severe artifacts than a temporal de-interlacer.

Figure 10:
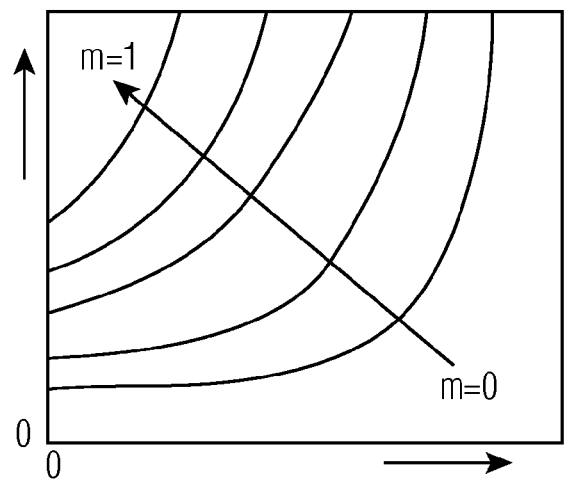
FIG. 10 illustrates the conversion from the errors to the mix factor with a bias towards the spatial de-interlacer.
Figure 11:
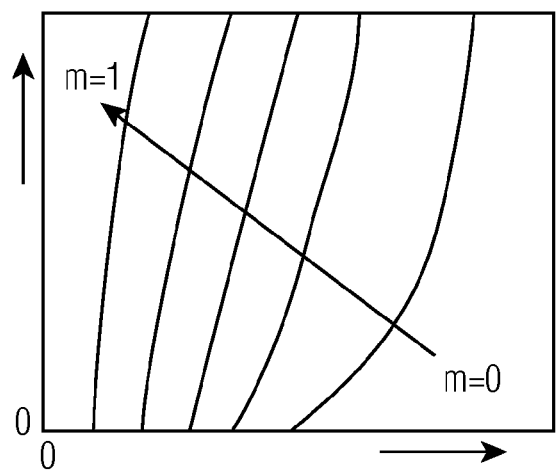
FIG. 11 illustrates the conversion from the errors to the mix factor with a bias towards the temporal de-interlacer.

FIG. 10 illustrates the conversion from the errors to the mix factor with a bias towards the spatial de-interlacer 24. And, FIG. 11 illustrates the conversion from the errors to the mix factor with a bias towards the temporal de-interlacer 26. The graphs of FIGS. 10 and 11 cannot simply be translated in expressions for calculating the mix factor m. However a look-up-table (LUT) can be generated. In one embodiment, the size of the LUT was limited by mapping the errors non-linearly into 16 entries of the LUT as shown in Table 2. The error values 0-3 are mapped into index 0, the error values 4-7 are mapped to index 1, etc.

TABLE 2

Non-linear conversion of the error metric into an index in the LUT (assuming 8 bits video)

| Error | | | | | | | | | | | | | | | |
|---|---|---|---|---|---|---|---|---|---|---|---|---|---|---|---|
| 4 | 8 | 16 | 24 | 32 | 40 | 48 | 56 | 64 | 80 | 96 | 112 | 128 | 160 | 192 | 256 |
| Index 0 | 1 | 2 | 3 | 4 | 5 | 6 | 7 | 8 | 9 | 10 | 11 | 12 | 13 | 14 | 15 |

Before the non-linear conversion table is used, the errors $\xi_{spat}(\vec{x}, n)$ and $\xi_{temp}(\vec{x}, n)$ are preprocessed according to:

$$\xi'_{spat}(\vec{x}, n) = \beta_s(\xi_{spat}(\vec{x}, n)) + \alpha P_{dir}$$

$$\xi'_{temp}(\vec{x}, n) = \beta_t(\xi_{temp}(\vec{x}, n)) \quad (21)$$

With $\beta_s$ and $\beta_t$ being a spatial and temporal gain factor, α is the mix factor used in the mix between the directional and vertical interpolation (See equation 19), and $P_{dir}$ is a penalty factor. The gain factor is used to set a general preference for the spatial or temporal de-interlacers. Note that an equal error in the spatial and temporal de-interlacers can still produce artifacts with different annoyances.

The additional term for the spatial error is linearly dependent on the mix factor used in the spatial de-interlacer. If α was set to '1', the spatial de-interlacer uses vertical interpolation only and the directional error has, accordingly, no relation with the produced output of the spatial de-interlacer. Therefore, the spatial error is 'penalized' for this, because there is less reliability with respect to the spatial error reflecting the spatially interpolated sample.

Note that the penalty term and the gain factor are not dependent on the local characteristics. The user can set these values to his or her preference.

Figure 12:
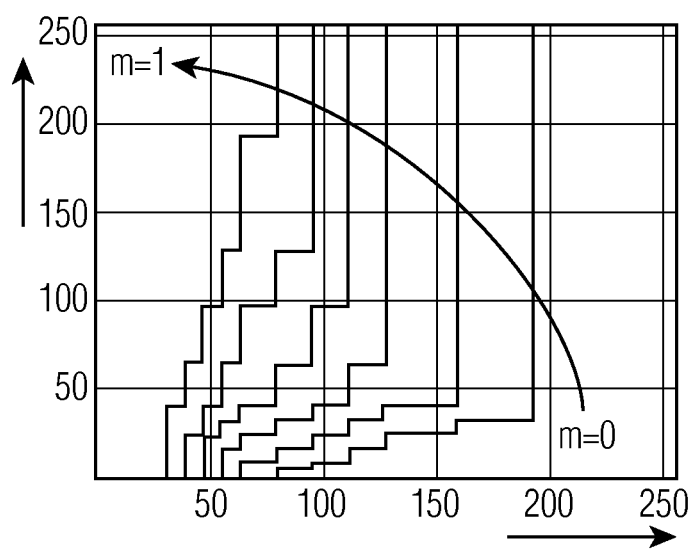
FIG. 12 is an exemplary chart of a 2-dimensional look-up-table graph with a preference for the temporal de-interlacer.

Using the non-linear conversion, the transformation from the error values to the mix factor can be realized. An example of an exemplary (discrete) LUT with preferences for the temporal de-interlacer is shown in FIG. 12. There are provided two LUTs, one with a preference for the special de-interlacer 24 and the other with a preference for the temporal de-interlacer 26. So in an exemplary embodiment of the inventions the spatial and temporal errors produce 2 mix factors.

Again, an exemplary embodiment may define two LUTs: one with a preference for the spatial de-interlacer 24 and anther with a preference for the temporal de-interlacer (26). So, a given spatial and temporal error produces 2 mix factors: $m_{spat}$ (spatial preference) and $m_{temp}$ (temporal preference).

As mentioned above, there is a mechanism to switch or, even better, mix the results of these 2 mix factors:

$$m(\vec{x},n)=g(\vec{x},n)m_{spat}(\vec{x},n)+(1-g(\vec{x},n))m_{temp}(\vec{x},n) \quad (22)$$

With $g(\vec{x},n)$ being another mix factor.

Figure 13:
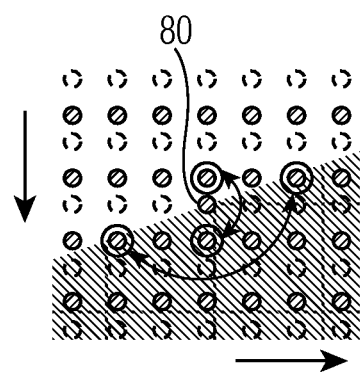
FIG. 13 illustrates the extraction of edge information.

As a first step towards calculating $g(\vec{x},n)$ and referring to FIG. 13, it is determined whether the current pixel 80 is part of a horizontal line or edge. If the pixel 80 is part of a horizontal line or edge, then directional interpolation has no added value, i.e., directional interpolation cannot add new vertical high frequency components to the current pixel. If the pixel 80 is not part of a pure horizontal line, than the 'stronger' the edge, and the stronger the bias towards the mix factor with the spatial preference. A signal $A_s$ is extracted to this extent:

$$A_s(\vec{x}, n) = \left\| \left| F\left(\vec{x} - \begin{pmatrix} 0 \\ 1 \end{pmatrix}, n\right) - F\left(\vec{x} + \begin{pmatrix} 0 \\ 1 \end{pmatrix}, n\right) \right| - \left| F\left(\vec{x} - \begin{pmatrix} P \\ 1 \end{pmatrix}, n\right) - F\left(\vec{x} + \begin{pmatrix} P \\ 1 \end{pmatrix}, n\right) \right| \right\| \quad (23)$$

The first term in equation 23 should yield a relative large number in a case of an edge (unless a very thin line is present), whereas the second term should yield a small number (interpolation along the edge if the edge has been correctly identified).

Similarly, if the field insertion does not seem to add new vertical high frequency components to the current pixel, it is less likely that the temporal de-interlacer will do so, and the spatial de-interlacer may be heavily relied on. This is characterized by:

$$A_T(\vec{x}, n) = \left| F(\vec{x}, n-1) - \text{MEDIAN}\left( F\left(\vec{x} - \begin{pmatrix} 0 \\ 1 \end{pmatrix}, n\right), F(\vec{x}, n-1), F\left(\vec{x} + \begin{pmatrix} 0 \\ 1 \end{pmatrix}, n\right) \right) \right| \quad (24)$$

Note that $A_T(\vec{x},n)$ is only unequal to zero if the vertical frequency is above $\tfrac{2}{3}^{rds}$ of the Nyquist frequency. (This leaves a gap of roughly $\tfrac{1}{6}^{th}$ of the Nyquist frequency. Note also that this is not a perfect representation, but, as experiments have revealed, it contributes positively to control the mix factor in Equation (22). $A_T(\vec{x},n)$ will be used to offset $A_S(\vec{x},n)$ (see below in Equation (25)).

With some expectations, if $A_T(\vec{x},n)=0$, it is an apparent indication that the current pixel can be de-interlaced by spatial processing as well. On the other hand, if $A_T(\vec{x},n)$ yields a large number, it indicates that temporal de-interlacing can add vertical high frequencies, and as such, adds value.

As a next step $A_S(\vec{x},n)$ and $A_T(\vec{x},n)$ are combined into one signal metric:

$$A(\vec{x},n)=A_S(\vec{x},n)-A_T(\vec{x},n) \quad (25)$$

$A(\vec{x},n)$ is used to indicate the bias towards spatial (large values for A) or temporal (small numbers for A) de-interlacer.

Thus the mix factor $g(\vec{x},n)$ is a function of $A(\vec{x},n)$ (see Equation (25)) and α (see Equation (7)), and is defined as:

$$g(\vec{x},n)=(1-\alpha)A(\vec{x},n) \quad (26)$$

Many variations and embodiments of the above-described invention and method are possible. Although only certain embodiments of the invention and methods have been illustrated in the accompanying drawings and described in the foregoing Detailed Description, it will be understood that the invention is not limited to the embodiments disclosed, but is capable of additional rearrangements, modifications and substitutions without departing from the invention as set forth and defined by the following claims. Accordingly, it should be understood that the scope of the present invention encompasses all such arrangements and is solely limited by the claims as follows:

What is claimed is:

1. A de-interlacer device comprising:
   a memory configured to receive and store picture information;
   a temporal de-interlacer configured to de-interlace picture information from the memory;
   a spatial de-interlacer configured to de-interlace picture information, the spatial deinterlacer configured to calculate a reliability of a directional interpolation;
   wherein the reliability of the directional interpolation is used to enable selection between a directional and a vertical interpolation, and wherein the reliability of the directional interpolation is calculated by calculating a luminance gradient approximately along the edge and calculating a luminance gradient approximately perpendicular to the edge and the dominant edge gradient is determined on a macro then a micro level; and a mixer configured to mix outputs of the temporal de-interlacer and the spatial de-interlacer according to a calculated mix factor;

wherein the calculated mix factor uses at least two error criteria.

2. The de-interlacer device of claim 1, wherein said the calculated mix factor is a nonlinear calculation.

3. The de-interlacer device of claim 1, wherein the temporal de-interlacer is configured to calculate a reliability of a temporal interpolation.

4. The de-interlacer of claim 1, wherein the spatial de-interlacer is configured to calculate a reliability of the directional interpolation.

5. The de-interlacer of claim 1, wherein the calculated mix factor depends on an expected contribution of outputs of the spatial de-interlacer and the temporal de-interlacer to high frequencies in the picture information.

6. The de-interlacer of claim 1, wherein the picture information is a video signal.

7. The de-interlacer of claim 1, wherein the calculated mix factor is based on at least two error functions.

8. The de-interlacer of claim 1, wherein the at least two error functions are a temporal error function and a spatial error function.

9. The de-interlacer of claim 8, wherein the spatial error function is a directional error function.

10. The de-interlacer of claim 1, wherein the spatial de-interlacer and the temporal de interlacer are configured to process the picture information in parallel.

11. A method of de-interlacing a video signal, the method comprising:

de-interlacing the video signal in a temporal de-interlacer;

de-interlacing the video signal in a spatial de-interlacer, the de-interlacing being performed in parallel;

calculating a first error factor and a second error factor;

non-linearly mapping the first error factor and the second error factor to at least one mix factor; and using the at least one mix factor to mix an output of the temporal de-interlacer and the output of the spatial de-interlacer, wherein the spatial de-interlacer produces a directional intepolated sample and the reliabili of the directional interpolation is calculated by calculating a luminance gradient approximately along the edge and calculating a luminance gradient approximately perpendicular to the edge and a dominant edge gradient is determined on a macro then a micro level.

wherein the mix factor depends on an expected contribution of outputs of the spatial deinterlacer and the temporal de-interlacer to high frequencies in the video signal.

12. The method of claim 11, wherein the method is used in a memory-based video processor.

13. The method of claim 11, wherein the first error factor is a temporal error and the second error factor is a spatial error.

14. A memory-based video processor comprising:

a temporal de-interlacer configured to process a video signal;

a spatial de-interlacer configured to process the video signal in parallel with the temporal de-interlacer, wherein the spatial de-interlacer produces a directional interpolated sample and the reliability of the directional interpolation is calculated by calculating a luminance gradient approximately along the edge and calculating a luminance gradient approximately perpendicular to the edge and a dominant edge gradient is determined on a macro then a micro level; and a mixer configured to receive outputs from the temporal deinterlacer and the spatial de interlaces;

the mixer configured to mix the received outputs according to a non-linear mix factor;

wherein the non-linear mix factor depends on at least two error functions and expected contributions of the spatial and temporal de-interlacer outputs to high vertical frequencies in the video signal.

15. The memory-based video processor of claim 14, further comprising a memory for storing the video signal.

16. The memory based video processor of claim 14, wherein the non-linear mix factor is based on a temporal error factor and a directional error factor provided by at least one of the temporal de-interlacer and the spatial de-interlacer.

17. The memory-based video processor of claim 14 wherein the spatial deinterlacer and the temporal de-interlacer are configured to process the picture information in parallel.

18. The memory-based video processor of claim 14, wherein the spatial deinterlacer is configured to calculate a reliability of a directional interpolation.

19. The memory-based video processor of claim 18 wherein the reliability of the directional interpolation is calculated by calculating a luminance gradient approximately along an edge and calculating a luminance gradient approximately perpendicular to the edge.

* * * * *